(No Model.)
D. C. LOCKWOOD.
PROCESS OF FORMING SOLID RINGS OF CELLULOID AND OTHER PLASTIC MATERIAL.
No. 251,259. Patented Dec. 20, 1881.
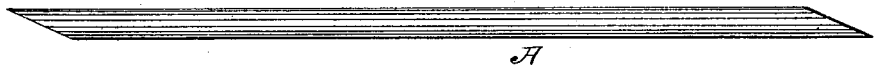
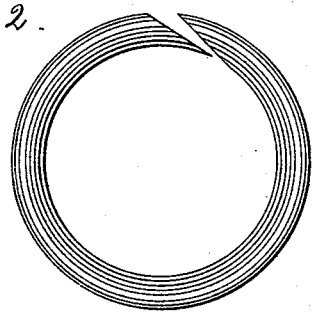
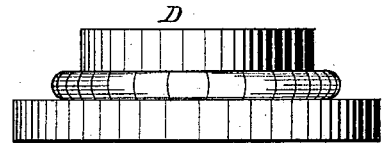
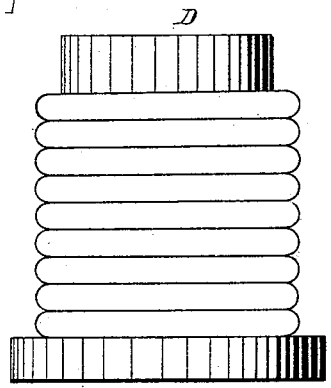
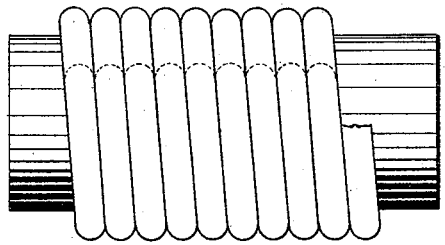
Witnesses:
Chas. C. Gill
Herman Gustow
Inventor:
David C. Lockwood,
By his Attorney,
Rowland Cox

UNITED STATES PATENT OFFICE.

DAVID C. LOCKWOOD, OF NEWARK, NEW JERSEY, ASSIGNOR TO THE RUBBER AND CELLULOID HARNESS TRIMMING COMPANY, OF SAME PLACE.

PROCESS OF FORMING SOLID RINGS OF CELLULOID AND OTHER PLASTIC MATERIAL.

SPECIFICATION forming part of Letters Patent No. 251,259, dated December 20, 1881.

Application filed September 2, 1881. (No model.)

*To all whom it may concern:*

Be it known that I, DAVID C. LOCKWOOD, of Newark, in the county of Essex and State of New Jersey, have invented a new and useful Improvement in Processes of Forming Solid Rings of Celluloid and other Plastic Material, of which the following is a specification; reference being had to the accompanying drawings.

The invention has relation to the formation of solid rings of plastic material. I contemplate its employment especially in the production of what are known as "martingale-rings," and the use especially of compounds of pyroxyline, and particularly that known as "celluloid."

In the manufacture of this class of rings it has heretofore been customary to form a ring by turning it, or in analogous ways. This has involved great loss of material, which has rendered the manufacture of the article difficult and expensive.

To obviate this objection to the methods heretofore known is the principal object of my invention, which is accomplished by the means and in the manner hereinafter set forth, by which there is not only substantially no loss of material, but a ring of superior quality is produced with greater rapidity and less difficulty.

The distinctive novelty of the invention consists in forming a rod of the material, which is cut into sections of appropriate length, manipulated to form a ring, introduced into a die or mold, and finally permitted to dry upon a hub of appropriate construction, all as hereinafter fully set forth.

In the accompanying drawings, Figure 1 shows a section or piece of rod. Fig. 2 shows the section or piece after it has been manipulated to form a ring and before it is introduced into the die or mold. Fig. 3 shows the same applied to the hub used to prevent the ring from warping. Fig. 4 is a view showing a modification of the hub. Fig. 5 illustrates a method of dividing a rod into sections or pieces of equal length.

I first prepare a rod of appropriate diameter, which is cut into sections that correspond in length with the ring which it is desired to produce. The piece or section, having been made ready, is bent to form a ring, as shown in Fig. 2, the ends being brought in contact with each other. The ring is then introduced into an appropriate mold or die and subjected to heat and pressure, which will cause the ends to be united or welded, forming a complete and unbroken ring. The steps hereinbefore described will, by preference, be taken while the piece is in a plastic condition; but a less satisfactory result may be attained when the material has become rigid. Under all circumstances, when the ring is taken from the mold or die its tendency to warp or twist is so great that it is essential that means be provided to prevent it from doing so. By my process I am able to correct this tendency, which I accomplish by the use of mechanism shown in Figs. 3 and 4, the important elements of which are the circular hubs D, corresponding as nearly as may be practicable with the interior periphery of the ring after it has been taken from the mold. As soon as it has been subjected to the action of the mold the ring will be passed over the hub D, and permitted to remain there until dried. I have discovered that by employing the hub I am enabled to prevent the ring from warping or shrinking to any material extent in any direction, except toward its center, against the hub, which produces no objectionable effect.

If preferred, the rod may be made to form a helical coil upon an arbor, as shown in Fig. 5, and the pieces or sections formed by cutting the coil in a given plane, as indicated by dotted lines in said Fig. 5; but the manner in which the sections are formed is a matter of judgment, which may be varied according to circumstances. The same is true of the form of the hub, except that it is essential that the core or part which resists the shrinkage toward the center be of appropriate size and shape and the ring held so that it will not warp or twist in a relatively vertical direction.

What I claim as my invention, and desire to secure by Letters Patent, is—

1. The within-described process of forming a solid ring of plastic material, which consists in, first, forming a piece or section, A; second, manipulating the piece to form a ring; and, third, subjecting the ring to heat and pressure in an appropriate mold.

2. The within-described process of forming a solid ring of plastic material, which consists in, first, forming a piece or section, A; second, manipulating the piece to form a ring; third, subjecting the ring to heat and pressure in an appropriate mold; and, fourth, permitting the ring to dry upon an appropriate hub.

3. The within-described process of forming a solid ring of plastic material, which consists in, first, forming a piece or section, A; second, manipulating the piece to form a ring; third, subjecting the ring to heat and pressure in an appropriate mold; and, fourth, permitting the ring to dry upon an appropriate hub, the steps being taken while the material is in a plastic condition.

In testimony that I claim the foregoing improvement in processes of forming solid rings of celluloid, plastic material, &c., as above described, I have hereunto set my hand this 30th day of August, 1881.

DAVID C. LOCKWOOD.

Witnesses:
CHAS. C. GILL,
HERMAN GUSTOW.